3,042,594
VIBRATION COMPACTION
Joseph J. Hauth, Richland, Wash., assignor to the United States of America as represented by the United States Atomic Energy Commission
No Drawing. Filed Mar. 7, 1960, Ser. No. 13,404
3 Claims. (Cl. 204—154.2)

This invention relates to a method of compacting a powder in a metal container. In more detail the invention relates to the vibration compaction of ceramic powders in metal tubes. And in greater detail the invention relates to the preparation of ceramic fuel elements for nuclear reactors by vibration compaction.

The art of compacting a powder within a tube finds obvious application in many fields. One field of importance and the field to which this specification is primarily addressed is that of the preparation of fuel elements for nuclear reactors. Such fuel elements may take the form of elongated metal tubes of relatively small diameter which are filled with a ceramic fuel material such as uranium dioxide, thorium dioxide, or plutonium dioxide, or mixtures thereof.

High density ceramic fuels are normally desirable because of their increased nuclear reactivity, fission product retention, thermal conductivity, and stability in high temperature coolants.

To obtain high density fuel elements, these elements have in the past been prepared by a consecutive series of steps including (1) incorporation of binder and lubricant, (2) manufacture of a "green" compact or body by cold pressing at pressures as great as 125 tons per square inch, by isostatic pressing, by extrusion, or by hot pressing, (3) sintering in an inert (argon, helium, steam) or a reducing (hydrogen) atmosphere at elevated temperatures (up to 3350° F.), (4) grinding the sintered ware to prescribed dimensions, and (5) encapsulating the finished ware in a protective encasement which has previously been formed, or machined, to closely specified dimensions.

An improved method of fabricating ceramic fuel elements forms the subject matter of patent application Serial No. 696,302 filed November 13, 1957, in the name of Frank B. Quinlan et al. The present invention may be used in combination with or in place of the swaging method described in that application.

It is accordingly an object of the present invention to develop a novel procedure for compacting a powder within a metal container.

It is a more detailed object of the present invention to develop an improved procedure for compacting ceramic materials within a metal tube by vibration.

It is a still more detailed object of the present invention to develop a method of preparing a high density ceramic fuel element for a nuclear reactor.

Compacting a powder by vibration is, of course, in constant use throughout the world. It has already been recognized that a higher density compact can be obtained by vibrational compaction of mixtures of selected particle size than can be obtained from powder of random size. A discussion of compaction by vibration and the best procedures therefor known prior to my invention appears in report NAA–SR–4155 issued October 1, 1959, which is available from the Office of Technical Services, Department of Commerce, Washington 25, D.C. It is noted from this report that the maximum attainable density was 9.00 gm./cm.$^3$ which is 82.2% of theoretical density. Since this density is lower than that desired for use in a nuclear reactor, the packed density of the material must be increased to the desired value by other means, as by swaging.

I have found that increased density can be had by vibrating the metal tube containing ceramic particles of selected size ranges at the resonant frequency of the metal tube; that a greater increase in density is noted when the frequency of vibration is varied to follow the change in resonant frequency due to greater packing of the powder; and that the maximum density can be obtained by varying the frequency across a wide range extending from much above the resonant frequency to below the resonant frequency. By this procedure compacts of sufficient density to use directly in a nuclear reactor can be prepared. However, if a slight additional increase in density is needed, the compact can be swaged following vibration compacting to attain a density higher than can be attained by either method alone.

A general description of the preparation of a fuel element for a nuclear reactor according to my invention will now be given. Previously sintered or fused compacts or lumps of a ceramic material are crushed and screened to separate the desired particle size fractions as discussed later. Predetermined amounts of the several fractions are weighed, and the mixture is thoroughly blended. The proper amount of the blend is then poured into an elongated metal tube which has a bottom end cap welded in place. The tube is attached to a large moving coil vibrator, and vibrated at frequencies varied gradually from 100 to 4000 cycles per second for three minutes. Densification occurs rapidly during the first few seconds of vibration, and more slowly thereafter, until at three minutes compaction is virtually complete. The density of the core is measured by a gamma absorptometer, and the fuel rod is cut to specified length. The second end cap is welded into place, and the rod is prepared for assembly in a fuel element. By this procedure densities of up to 90% of the theoretical can be achieved, which are reproducible to within 1%.

A detailed example of the preferred mode in which the invention is carried out will next be given. The fuel rod being prepared is intended for use in the plutonium recycle test reactor now under construction at Hanford Engineer Works, Richland, Washington. Specifications for this reactor require uranium dioxide of a density of 84.5% of the theoretical crystallographic density.

Sintered or fused uranium dioxide is crushed and screened into the desired size fractions. A weighed amount of the material is poured into a Zircalloy-2 tube to which a lower end cap had previously been welded. A weighted follower consisting of a weight and an elongated, graduated rod is employed in the tube. This tube was vibrated on a Genisco-Savage V 1000 B moving coil vibrator, which was driven by two 1-kilowatt amplifiers in series, using the signal from a Dymec 5- to 5000-c.p.s. sweep-frequency oscillator. The air-cooled vibrator is capable of ±750 pounds thrust.

The specific procedure employed was to set the initial frequency at 1 kc.p.s. at low power, well above the resonant frequency of the empty metal sheath. The frequency was then rapidly reduced, thereby partially orienting and compacting the particles. At a relatively low frequency—about 180 c.p.s.—a very sharp increase in amplitude and acceleration was noted, with simultaneous rapid densification. This was apparent from the way the follower dropped rapidly in the tube. When the resonant frequency was reached full power was turned on. The frequency was then swept slowly back and forth across the resonant frequency several times (±100 c.p.s.), the resonant frequency changing to about 240 c.p.s. as the particles densified.

The frequency was then lowered to about 100 c.p.s. and then again raised to the resonant frequency and then swept across the resonant frequent several times. The frequency was then raised until a harmonic of the fundamental resonant frequency was reached and swept back and forth across the harmonic. It was then raised to about 4 k.c.p.s. This entire procedure took about three minutes.

The fuel rods obtained are completely satisfactory, no dimensional changes occurring nor any damage to the cladding either before or after irradiation which can be attributed to the vibrations.

The procedure employed involved manual "tuning" of the vibrator. Therefore the rates of frequency change were not identical. The time given for carrying out the entire procedure will indicate the approximate rates of change which should be employed.

Automatic frequency cycling was investigated with the aid of a mechanism installed on the oscillator to "sweep" various frequency ranges. Effects of automatic and manual frequency changing were compared by observing the rate of compaction, as indicated by a follower rod resting on top of the fuel column. Various rates of frequency change were shown to produce the required high densities in a shorter time than a fixed rate of change. With the present instrumentation, manual tuning permits closer correlation of rate of compaction with frequency of vibration and rate of frequency change than does automatic frequency cycling at a fixed rate of change. Use of automatic or manual frequency tuning both fall within the scope of the present invention.

The described procedure was followed because it was found that each type of fuel element, and to a lesser extent each fuel element of a given type, is different involving a unique fit of the mechanical properties of the vibrating system, the particle size and size distribution of the fuel material, and very slight differences in procedure. For example, differences in loading, the fuel material, in coupling the fuel tube to the vibrator, etc. change slightly the frequencies which are most effective in compacting the fuel material. The described procedure ensures maximum compaction regardless of these small variations.

It was found desirable to use the weighted follower but this is not essential in carrying out the invention.

The following table gives the results of several tests using the above procedure.

uranium dioxide was 90% of the theoretical while the maximum density using sintered and crushed uranium dioxide was 87%.

While the discovery that increased density can be attained by proper selection of size range fractions is not my invention, it is apparent from the table that the use of several distinct fractions of different size range is essential to obtain a compact of density high enough to be used directly in a nuclear reactor. The table clearly indicates the sizes used to obtain greatest densification as well as the results of varying somewhat from the optimum. The criteria for selecting the optimum size range fractions for use with this invention are those developed by the prior workers in the art.

A slight increase in density on the order of 2% can be attained by swaging the vibratory compacted tube. The resultant compact has a density higher than can be obtained by swaging tamp packed tubes. However, the increase in density is not sufficient in general to warrant the additional expense since the vibratory packed rod is satisfactory without further effort.

While the reason for the improved results obtained is not completely understood, it is believed that at the resonant frequency, forced vibration produces periodic expansion and contraction of the container walls, which compacts the contained material by what can be described as a "self-swaging" action. Individual particles are oriented by vibration into available void spaces, and compressed by the "swaging" action of the container walls without the necessity for external impacting or compressing forces. The vertical amplitude of the vibrations of the tube at its top is many times the amplitude of the vibrations given the tube by the vibrator. As the vibrations travel up the tube the swaging action occurs.

The basic advantage of the present invention is obtained by vibrating the tube at its resonant frequency. An increased advantage is obtained by following the resonant frequency as it changes due to increased compaction of the material.

In a tube filled with granular fuel material, the resonant frequency is lower than in the empty tube. For example, a 4-foot tube having a resonant frequency of

TABLE I

*Density of Compaction $UO_2$*

| Type | Particle Size Compn. | | Wt. of $UO_2$ (kg.) | Zr-2 Tube Size | Density, percent T. D. | |
|---|---|---|---|---|---|---|
| | Wt. Percent | Tyler Mesh | | | Syntron Packer | Moving Coil Vibrator |
| Sintered and Crushed [1] | 100 | [4]—20+100 | 3.3 | 7 ft., .750″ O. D. x .035 | 58–62 | 69 |
| Do | 60 / 15 / 25 | −3+8 / −20+100 / −200 | 3.0 | 8 ft., .570″ O. D. x .030 | | 85 |
| Do | 60 / 40 | −3+8 / −20+100 | 3.5 | 8 ft., .570″ O. D. x .030 | | 84 |
| Do | 60 / 18 / 22 | −6+10 / −35+65 / −200 | 3.2 | 8 ft., .570″ O. D. x .030 | | 87 |
| Fused, Crushed [2] | 60 / 15 / 25 | −6+10 / −35+65 / −100+200 | 1.8 | 8 ft., .570″ O. D. x .030 | 82 | 90 |
| Do | 60 / 20 / 20 | −14+20 / −65+100 / −200+325 | 1.0 | 3 ft., .750″ O. D. x .035 | | 83.1 |
| Electrolytic [3] | As-Produced | | 1.6 | 3 ft., .750″ O. D. x .035 | 53 | 65 |

[1] Particle Density 95% T.D.
[2] Particle Density 99% T.D.
[3] Particle Density 93% T.D.
[4] Particle size range for swaged PRTR fuel elements.

The table includes for comparison the results of a few tests by a Syntron vibratory packer on which this specific procedure could not be used. It will be noted that improved results are attained even though the powder compacted was as crushed.

It will also be apparent that by proper selection of particle size fractions a compact can be obtained of sufficient density to use directly in a nuclear reactor. The maximum density obtained using fused and crushed 750 c.p.s. when empty has a resonant frequency of 365 c.p.s. when containing one kilogram of loose uranium dioxide powder and a resonant frequency of 440 c.p.s. when the powder is compacted to about 85% of theoretical density. To obtain this advantage vibration can be started at 365 c.p.s. and raised to 440 c.p.s. as the powder compacts.

An additional improvement is obtained by sweeping across a wide frequency range. This improvement applies primarily to tubes in which the fundamental resonant frequency is low, such as the elongated tubes used in the specific examples. This is because of the increased densification obtained by vibrating at a harmonic of the fundamental resonant frequency. However, vibration at frequencies both above and below the resonant frequency is effective regardless of whether a harmonic is struck and increases both the density and uniformity of the compact. This improvement is attributed to preferential orientation of various sized particles in the mixture by vibrations of various amplitudes and frequencies.

The following table illustrates the increased improvement in densification obtained as the various modifications to the procedure described above are brought into play. The mixture employed was a mixture of $UO_2$ particles of 95% of theoretical density which was packed in a 4-foot Zircalloy-2 tube.

TABLE II

| Method: | $UO_2$ density, percent of theoretical |
|---|---|
| (1) Conventional vibratory packer (110 volt) 60 c.p.s.; impact top and bottom | 73.6 |
| (2) Moving coil vibrator (2 kw., ±750 lbs. thrust): | |
| (a) 60 c.p.s. | 77.1 |
| (b) Initial resonance frequency (365 c.p.s.) | 80.0 |
| (c) Initial to final resonance frequency (365 to 440 c.p.s.) | 82.6 |
| (d) Frequency sweep, present procedure; 100 to 5,000 c.p.s. | 84.8 |

The relatively low densities obtained in this series of tests are due to somewhat less than optimum particle density and particle size distribution. It will be observed, however, that the fuel rod prepared by a frequency sweep came up to specifications for the PRTR. In addition the shorter rods do not have as high density as the full-length eight-foot rods because of the enhanced self swaging effect of the longer tubes.

The method according to the present invention is applicable not only to elongated, slender fuel rods, although its advantages are most evident with such fuel rods, but also to short and squat tubes. Improvement in densification in the short tubes is obtained over that obtained by vibration without regard to the resonant frequency.

The specific apparatus described is very well suited to the exercise of the invention, but the invention is not restricted thereto. All that is needed is a shaker giving the tube to be filled a vertical shake which can be driven continuously at varying amplitude, frequency, and acceleration.

The invention is particularly applicable to the fabrication of fuel rods containing plutonium wherein a serious health hazard obtains during preparation by conventional methods. The invention is also extremely applicable to produce uniformly high-density fuel elements of complex geometries that are not amenable to swaging. For example, nested tubular and internally cooled fuel elements may be prepared very easily by this procedure.

To summarize, ceramic nuclear fuel elements prepared by my vibrational compaction method are sufficiently dense to be used directly in a reactor without any further compaction treatment. In addition no straightening or extensive machining is required to clean the outside surfaces of the fuel elements. The procedure is extremely simple requiring relatively inexpensive machinery and only a short period of time. And finally the procedure is particularly applicable to plutonium-containing fuels and to fuel elements of complex geometry.

It will be understood that this invention is not to be limited to the details given herein but that it may be modified within the scope of the appended claims.

What is claimed is:
1. A method of compacting a powder consisting of different size range fractions within a metal container comprising vibrating the container in a vibrator giving a vertical shake to the container at frequencies above and below its resonant frequency including a harmonic of the resonant frequency and also sweeping the frequency of vibration across the resonant frequency several times thereby following the change in resonant frequency caused by compaction of the powder.

2. A method of preparing a fuel element for a nuclear reactor comprising crushing and screening sintered or fused uranium dioxide into a plurality of size range fractions, blending selected size range fractions which have a large size ratio between successive fractions, introducing said blend into an elongated metal tube to which a lower end cap has been welded, vibrating said tube in a vibrator giving a vertical shake to the tube in accordance with the following cycle:
(1) vibrate at low power at a frequency above the resonant frequency,
(2) rapidly reduce the frequency of vibration until the resonant frequency of the tube is reached,
(3) increase the power and sweep the frequency of vibration across the resonant frequency several times,
(4) reduce the frequency of vibration to a frequency below the resonant frequency of the tube,
(5) raise the frequency of vibration to the resonant frequency and sweep the frequency of vibration across the resonant frequency several times,
(6) increase the frequency of vibration until a harmonic of the resonant frequency is reached and sweep across this frequency several times,
(7) increase the frequency of vibration to a frequency much above the resonant frequency,
and then cutting the fuel tube to the desired length and welding a top end cap thereto.

3. A method of preparing a fuel element for a nuclear reactor comprising crushing and screening sintered or fused uranium dioxide into a plurality of size range fractions, blending a mixture including about 60% of particles having a mesh size of −3 to +10, about 15% of particles having a mesh size of −20 to +100, and about 25% of particles having a mesh size of −100 to +200, introducing said blend into an elongated tube composed predominantly of zirconium to which a lower end cap has been welded, vibrating said tube in a vibrator giving a vertical shake to the tube in accordance with the following cycle:
(1) vibrate at about 1000 c.p.s. at low power,
(2) rapidly reduce the frequency of vibration until the resonant frequency of the tube is reached,
(3) increase the power and sweep the frequency of vibration across the resonant frequency several times,
(4) reduce the frequency of vibration to about 100 c.p.s.,
(5) raise the frequency of vibration to the resonant frequency and sweep the frequency of vibration across the resonant frequency several times,
(6) increase the frequency of vibration until a harmonic of the resonant frequency is reached and sweep across this frequency several times,
(7) increase the frequency of vibration to about 4000 c.p.s.,
and then cutting the fuel tube to the desired length and welding a top end cap thereto.

References Cited in the file of this patent

UNITED STATES PATENTS 2,920,430    Skinker _____ Jan. 12, 1960

OTHER REFERENCES

University Physics, 1953, by Sears and Zemansky, published by Addison-Wesley Publishing Company, Inc., Cambridge 42, Mass., pp. 371–372.

AEC document, NAA–SR–4155, October 1959.